United States Patent [19]

Sugiyama

[11] Patent Number: 5,606,543

[45] Date of Patent: Feb. 25, 1997

[54] RECORDING MULTIPLEX CODED SIGNALS ON A DISK RECORDING MEDIUM WITH A PRIORITY SWITCHING MEANS

[75] Inventor: Kenji Sugiyama, Yokosuka, Japan

[73] Assignee: Victor Company of Japan, Ltd., Yokohama, Japan

[21] Appl. No.: 343,922

[22] Filed: Nov. 17, 1994

[30] Foreign Application Priority Data

Nov. 19, 1993 [JP] Japan ................................... 5-314173

[51] Int. Cl.$^6$ ................................ G11B 7/24; H04N 7/12
[52] U.S. Cl. ........................ 369/124; 369/275.3; 348/408
[58] Field of Search ............................ 369/124, 47, 86, 369/275.3; 348/416, 699, 384, 390, 413, 397, 402, 437, 398, 408

[56] References Cited

U.S. PATENT DOCUMENTS

| | | | |
|---|---|---|---|
| 5,122,875 | 6/1992 | Raychaudhuri et al. | 348/390 |
| 5,168,356 | 12/1992 | Acampora et al. | 348/409 |
| 5,315,578 | 5/1994 | Furukawa | 369/275.3 |
| 5,410,355 | 4/1995 | Kolczynski | 348/438 |
| 5,436,665 | 7/1995 | Ueno et al. | 348/412 |
| 5,440,345 | 8/1995 | Shimonda | 348/411 |

*Primary Examiner*—Georgia Y. Epps
*Assistant Examiner*—Kim-Kwok Chu
*Attorney, Agent, or Firm*—Jacobson, Price, Holman & Stern, PLLC

[57] ABSTRACT

A coding apparatus codes signals of a plurality of sorts, multiplexes the coded signals, and records the coded and multiplexed signals on a disklike recording medium. A reproducing apparatus reproduces the recorded signals from the disklike recording medium. The signals to be recorded are separated hierarchically into priority signals to be reproduced preferentially and non-priority signals other than the priority signals, and the separated signals are coded respectively. Whenever the code quantity of the coded signals reaches a predetermined code quantity determined for each track on the recording medium, the coded priority signals and the coded non-priority signals are switched and then outputted. These outputted signals are recorded on a disklike recording medium having roughly a constant recording density in the track direction. Further, the sorts of the signals are switched at predetermined rotational angles of the disklike recording medium. Further, the priority signals and the non-priority signals are switched for each predetermined code quantity of signals reproduced from the disklike recording medium, and then decoded for reproduction. Or else, only the priority signals can be decoded for reproduction.

5 Claims, 5 Drawing Sheets

5,606,543

RECORDING MULTIPLEX CODED SIGNALS ON A DISK RECORDING MEDIUM WITH A PRIORITY SWITCHING MEANS

BACKGROUND OF THE INVENTION

1. Field of the Invention

The present invention relates to a coding apparatus for processing digital signals; a recording medium for recording signals coded by the coding apparatus; and a reproducing apparatus for reproducing the signals recorded on the recording medium, and more specifically to a signal coding apparatus for coding video signals hierarchically into a plurality of sorts of video signals, multiplexing the coded video signals, and recording the multiplexed video signals on a disklike recording medium of a constant recording density; the disklike recording medium for recording the coded and multiplexed video signals; and the reproducing apparatus for reproducing the multiplexed and recorded video signals from the recording medium.

2. Description of the Prior Art

When video signals are coded at high efficiency, there exists such a case that the video signals are classified into a plurality of sorts of video signals hierarchically, and only the video signals to be reproduced preferentially according to the object are decoded and then reproduced (referred to as priority signals, hereinafter). In this case, even if the non-priority signals other than the priority signals are once read, the read non-priority signals remain unused.

Here, the priority signals reproduced based on priority are signal components of lower frequencies or quantized coarsely from the time and spacial points of view in the hierarchical coding, which can be used alone. On the other hand, the non-priority signals are differential signals between the signals to be coded and the signal components of high frequencies or quantized coarsely from the time and spacial points of view in the hierarchical coding, which cannot be used alone.

For example, in the hierarchical coding of the current TV signals and the HDTV (high definition) signals, there exist video signals having codes of the current TV signals and codes of differential signals between the current TV signals and the HDTV signals. In this case, the HDTV video signals can be obtained by decoding both of the signals (the current TV and the differential HDTV signals) and by adding both of the decoded video signals. On the other hand, when only the current TV signals are required, only the current TV video signals are decoded.

Further, in the case of such a storage media, it is possible to realize a high speed search by seeing the picture. In this case where the interframe prediction is adopted, the video signals in only one frame are coded independently for each several frames. Further, in the case of the high speed search mode, only the video signals coded independently, that is, only the independent video signals are reproduced.

An example of a prior art coding apparatus will be explained with reference to FIG. 1. In FIG. 1, the coding apparatus codes video signals hierarchically at different resolutions according to the current TV signals and the HDTV signals, for instance.

In more detail, in FIG. 1, the video signals inputted through the video input terminal 1 are the HDTV signals, and the inputted HDTV signals are given to a low-pass filter (LPF) 2 and a subtracted (subtrahend) input of a subtracter 3. The frequency band of the inputted signals is limited by the LPF 2 down to about ½ in both the vertical and horizontal directions in accordance with the subsampling, and then applied to a subsampler 14. The number of pixels of the applied video signals is further reduced by the subsampler 14 down to about ½ in both the vertical and horizontal directions, and then the reduced video signals are given to a coder 11 and an interpolator 4 as the current TV signals.

The current TV signals are DCT (discrete cosine transform) processed by the coder 11, and the transformed coefficients are quantized in an appropriate step width. The coded and compressed video codes are then given to a multiplexer 41.

On the other hand, the pixels omitted by the subsampler 14 are interpolated by the interpolator 4 to obtain the video signals whose number of pixels is the same as that of the input video signals, and then given to a subtracting (minuend) input of the subtracter 3. The interpolated signals are subtracted from the input signals by the subtracter 3 to obtain differential HDTV signals. The obtained differential HDTV signals are given to a coder 5.

The operation of the coder 5 is basically the same as that of the coder 11 for coding the current TV signals, and only the number of sampled signals to be process is different. The video codes outputted by the coder 5 are given to the multiplexer 41.

The codes of the differential HDTV signals and the codes of the current TV signals are multiplexed by the multiplexer 41 for each predetermined quantity of codes, and then outputted through a code output terminal 9. The codes obtained by the coding apparatus as described above are reformed into a code form suitable for the recording medium by a channel encoder, and then recorded on a disklike recording medium (referred to as a disk, hereinafter).

Next, an example of the prior art reproducing apparatus for reproducing the video signals coded by the coding apparatus as shown in FIG. 1 and then recorded on the disk will be described hereinbelow with reference to FIG. 2.

In FIG. 2, the signals recorded in a disklike recording medium (not shown) are read by a signal reader 21 and the read signals are given to a channel decoder 22. The signal reader 21 is composed of a recording medium driving system, a pickup, etc., and the reading positions (track numbers) of the recording medium are controlled by a read controller 27.

The codes are reproduced from the read signals by the channel decoder 22, and then given to a demultiplexer 51 after some processing such as error correction. Further, the track position signals detected by the channel decoder 22 are given to the read controller 27 for control of the reader 21.

The codes of the current TV signals and the codes of the differential HDTV signals multiplexed for each predetermined code quantities are separated from each other by the demultiplexer 51. The current TV signal codes are given to a decoder 29, and the differential HDTV signal codes are given to a decoder 24, respectively.

The codes given to the decoder 24 are replaced with representative values by the reverse quantization processing (reverse DCT processing) by the decoder 24 to obtain the reproduced video signals of the differential HDTV signals. In the same way, the reproduced video signals of the current TV signals can be obtained by the decoder 29.

The output of the decoder 24 is given to an adder 25. The output of the decoder 29 is given to an interpolator 4 to interpolate the reproduced current TV signals to obtain the video signals having the original number of pixels. The obtained reproduced signals are given to an adder 25. The interpolated current TV signals and the differential HDTV signals are added by the adder 25 to obtain the reproduced HDTV signals. The obtained signals are outputted through a video output terminal 26.

In the prior art image coding apparatus, the prior art disklike recording medium, and the prior art reproducing apparatus for the hierarchical video signals as described above, however, since only some specified signals (e.g., low resolution video signals in the hierarchical coding) cannot be reproduced, even when only the specific signals are required to be reproduced, it has been necessary to read unnecessary signals at the same time. In particular, in the case of the disk rotated at a constant linear velocity (referred to as CLV, hereinafter), since the quantity of codes for each one revolution of the disk changes according to the recording positions (the radius of the signal track), the points at which the sorts of recorded signals are switched are not related to the revolution angles of the disk, so that it has been difficult to read only the specific signals.

SUMMARY OF THE INVENTION

With these problems in mind, therefore, it is the object of the present invention to provide a signal coding apparatus, a disklike recording medium, and a reproducing apparatus therefor, by which only specific signals can be reproduced easily on a priority basis, from the disklike recording medium on which a plurality of sorts of continuous signals multiplexed hierarchically are coded and recorded.

To achieve the above-mentioned object, a coding apparatus according to the present invention, for coding a plurality of sorts of signals, multiplexing the coded signals, and recording the coded and multiplexed signals on a disklike recording medium, comprises separating means for hierarchically separating signals to be recorded into priority signals to be reproduced preferentially and non-priority signals other than the priority signals; first coding means for coding the priority signals; second coding means for coding the non-priority signals; code quantity counting means for generating a timing signal whenever a quantity of coded signals reaches a predetermined code quantity determined for each track of the recording medium; and switching means for switching the coded priority signals and the coded non-priority signals on the basis of the timing signal and outputting the switched and coded signals.

Further, in the coding apparatus, said code quantity counting means generates the timing signal controllably in such a way that the code quantity of the priority signals differs from the code quantity of the non-priority signals switched before or after the priority signals.

Further, in a disklike recording medium according to the present invention having a roughly constant recording density in a track direction, continuous signals separated into a plurality of sorts hierarchically are recorded thereon; and the sorts of the signals are changed at predetermined revolution angles of the disklike recording medium.

Further, a reproducing apparatus according to the present invention comprises: code quantity counting means for generating a timing signal for each predetermined code quantity by counting a code quantity of signals recorded on a disklike recording medium, the disklike recording medium having a roughly constant recording density in a track direction and recording continuous signals separated hierarchically into priority signals to be reproduced preferentially and non-priority signals other than the priority signals in such a way that the priority signals are changed to the non-priority signals or vice versa at predetermined revolution angles of the disklike recording medium; switching means for switching reproduced signals from the priority signals to the non-priority signals or vice versa and outputting the switched reproduced signals; control means for controlling the timing of the switching of said switching means on the basis of the timing signal; and reproducing means for reproducing signals recorded on the disklike recording medium by decoding the switched and outputted priority signals or non-priority signals.

Further, a reproducing apparatus according to the present invention comprises: a signal reader for reading signals recorded on a disklike recording medium having a roughly constant recording density in a track direction and recording continuous signals separated hierarchically into priority signals to be reproduced preferentially and non-priority signals other than the priority signals in such a way that the priority signals are changed to the non-priority signals or vice versa at predetermined revolution angles of the disklike recording medium; code quantity counting means for generating a timing signal for each determined code quantity according to the priority signals and the non-priority signals by counting a code quantity of the read signals; control means for controlling said signal reader on the basis of the timing signal to read only the priority signals; and reproducing means for reproducing only the priority signals recorded on the disklike recording medium by decoding the read priority signals.

DETAILED DESCRIPTION OF THE EMBODIMENTS

The embodiment of the signal coding apparatus according to the present invention will be described hereinbelow with reference to FIG. 3.

Figure 3:
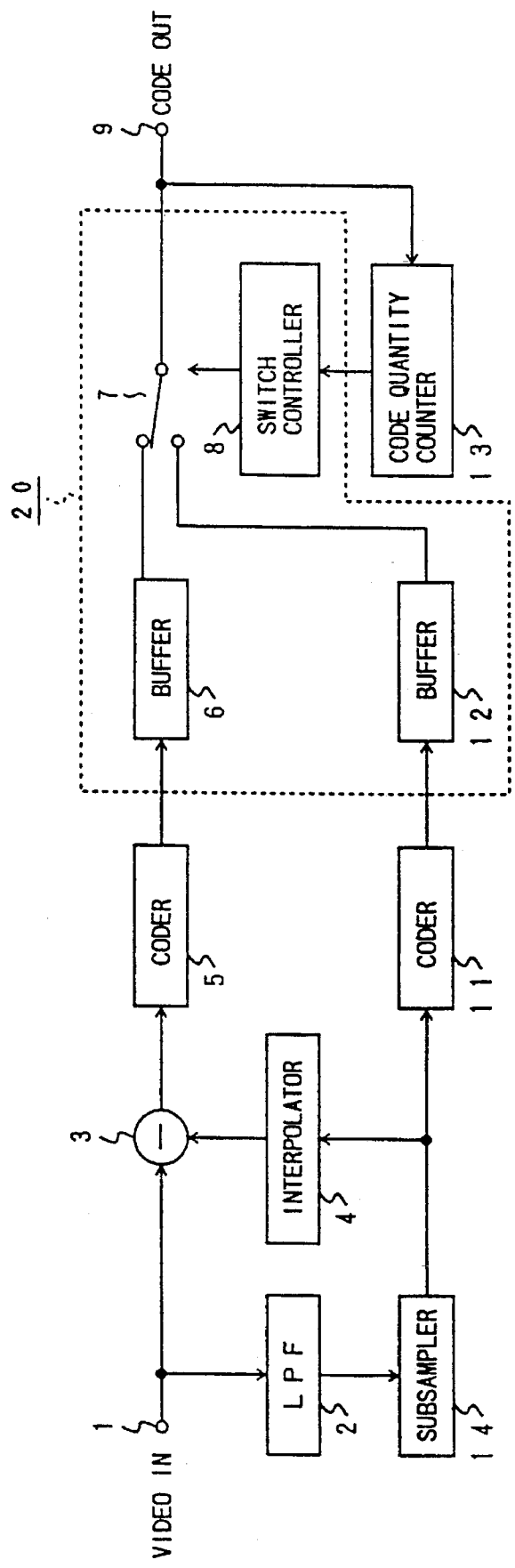
FIG. 3 is a block diagram showing an embodiment of the signal coding apparatus according to the present invention.

In the signal coding apparatus shown in FIG. 3, the current TV signals are obtained from the HDTV signals, and the obtained video signals are coded hierarchically and then recorded on a disk. Further, only the current TV signals can be reproduced from the disk where required.

Figure 1:
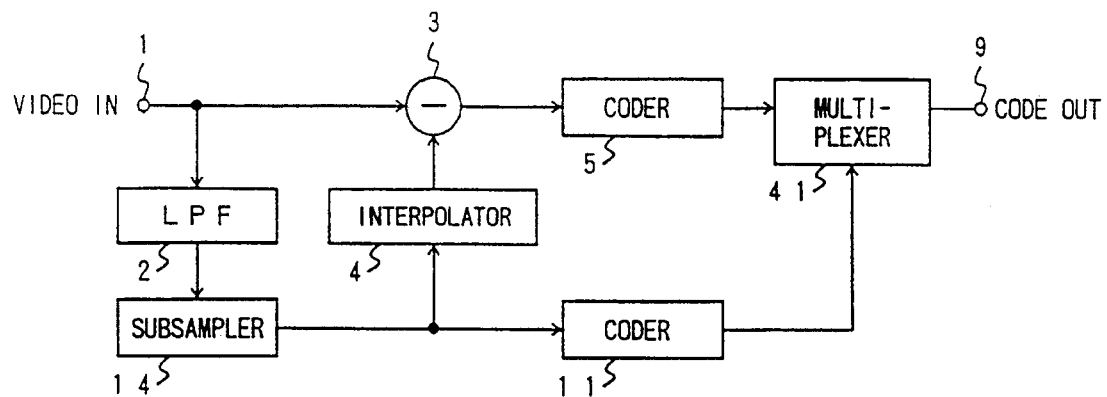
FIG. 1 is a block diagram showing an example of a prior art coding apparatus.

In FIG. 3, the same reference numerals have been retained for the same elements which have the same functions as with the case of the prior art coding apparatus shown in FIG. 1. The major difference between the coding apparatus shown in FIG. 1 and the coding apparatus shown in FIG. 3 is that in FIG. 3, coding multiplexing means 20 (composed of two buffers 6 and 12, a change-over switch 7 and a switch controller 8) and a coding quantity counter 13 are provided, instead of the multiplexer 41 shown in FIG. 1.

In FIG. 3, the video signals inputted through the video input terminal 1 are the HDTV signals. The inputted HDTV signals are given to a low-pass filter (LPF) 2 and a subtracted (subtrahend) input of a subtracter 3. The frequency band of the inputted signals is limited by the LPF 2 down to about ½ in both the vertical and horizontal directions in accordance with the subsampling, and then applied to a subsampler 14. The number of pixels of the applied video signals are further reduced by the subsampler 14 down to about ½ in both the vertical and horizontal directions, and then the reduced video signals are given to a coder 11 and an interpolator 4 as the current TV signals.

The current TV signals are DCT (discrete cosine transform) processed by the coder 11, and the transformed coefficients are quantized in an appropriate step width determined to control the quantity of the generated codes. The quantized signals are variable-length coded and compressed as video codes, and then given to a buffer 12.

The step width of the quantization is controlled according to the sufficiency rate of a virtual buffer so that the outputted codes can be set to a predetermined transfer rate. Here, the virtual buffer implies a buffer obtained on the assumption that the data is outputted at a fixed rate. Therefore, the quantity of fluctuating codes can be made uniform by the buffer 12 and then given to the change-over switch 7.

Further, when the output of the buffer 12 is not selected by the change-over switch 7, quantity of codes accumulated by the buffer 12 only increases, it is not appropriate to control the transfer rate on the basis of the sufficiency rate of the buffer 12. In this case, the quantity of the generated codes is controlled instead by the virtual buffer on the assumption that the data is outputted at a fixed rate.

On the other hand, the pixels omitted by the subsampler 14 are interpolated by the interpolator 4 to obtain the interpolated signals whose number of pixels is the same as that of the input video signals, and then the interpolated video signals are given to a subtracting (minuend) input of the subtracter 3. The interpolated video signals are subtracted from the input video signals by the subtracter 3 to obtain the differential HDTV signals. The obtained differential HDTV signals are given to a coder 5.

The operations of the coder 5 and the buffer 6 are basically the same as those of the coder 11 and the buffer 12, respectively, and only the number of sampled signals to be processed is different. The video codes compressed by the coder 5 are given to the change-over switch 7 via the buffer 6.

The video codes of the buffer 12 or the video codes of the buffer 6 are both selected by the change-over switch 7, and the selected video codes are outputted through the code output terminal 9 and further given to the code quantity counter 13.

The quantity of codes is counted by the code quantity counter 13, and a timing signal is outputted to the switch controller 8 for each predetermined quantity of codes. Here, the predetermined quantity of codes is a value which corresponds to a recording capacity of a virtual track for recording the codes. Therefore, the timing signal (which indicates a specific angular position of the disk) is given to the switch controller 8.

In the case where the disk is of CLV (constant linear velocity), since the quantity of codes for each revolution of the disk changes according to the radial recording position, the bit count of the code quantity counted by the code quantity counter 13 is changed according to the track numbers.

For instance, when the video signals are recorded beginning from the inner circumference to the outer circumference of the disk, the assumption is made as follows: the code quantity on the circumference of the first track is R and the code quantity increases by an increment a for each disk revolution. Then, R is first counted, and then R+a is counted next. That is, whenever the bit count ends for one revolution, the timing signal indicative of a predetermined angular position of the virtual track is outputted and further the count value is reset, proceeding to the succeeding count by increasing the increment a.

The change-over switch 7 is controlled by the switch controller 8 on the basis of the timing signal and a ratio of the previously determined code transfer rates of the current TV signals and the differential HDTV signals. Under control of the switch controller 8, the change-over switch 7 outputs any one of the signals of the buffer 6 and the buffer 12.

The above-mentioned switching is made at such a timing that the virtual track reaches a predetermined angular position. For instance, when both the transfer rates of the current TV signals and the differential HDTV signals are the same, the virtual tracks are selected alternately. When the ratio of both the transfer rates is 2:1, after one of them is selected twice continuously, the other is selected once.

Further, when the current TV signals are reproduced by the disk reproducing apparatus as described later, it is necessary to take into account that there exists some reading loss due to the skipping of the tracks from which data are read. In this case, it is possible to solve this problem by setting the code quantity of the current TV signals for each time to a value slightly smaller than that for each disk revolution, without reading the differential HDTV signals.

Accordingly, the timing at which the buffer 6 is switched to the buffer 12 is slightly offset from the timing at which the buffer 12 is switched to the buffer 6, by the switch controller 8. At the same time, the transfer rates of the respective coded signals are corrected.

Figure 4A:
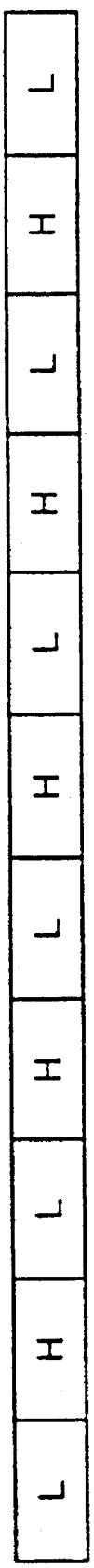
FIGS. 4A and 4B are illustrations for assistance in explaining data streams obtained by the coding of the coding apparatus according to the prior art and the present invention respectively.
Figure 4B:

FIGS. 4A and 4B show the forms of the obtained data streams. FIG. 4A shows the data stream obtained by the prior art coding apparatus, in which the code quantity of codes L of the current TV signals is always equal to the code quantity of codes H of the differential HDTV signals. On the other hand, FIG. 4B shows the data stream obtained by the coding apparatus according to the present invention, in which the code quantity of codes L of the current TV signals is determined slightly smaller than the code quantity of codes H of the succeeding differential HDTV signals, and in addition the code quantity is increased by a predetermined value with increasing time elapsed in both the codes H and L. In other words, FIG. 4B shows a data stream obtained by changing (increasing) the switching timing little by little. To obtain the data stream as shown in FIG. 4B, the timing at which the buffer 6 is switched to the buffer 12 is determined later than the timing at which the buffer 12 is switched to the buffer 6. Further, the code quantity counted by the code quantity counter 13 is controllably changed according to the delayed timing.

The data stream outputted by the coding apparatus according to the present invention is reformed into signals suitable for the recording medium by a channel encoder, and then recorded on the recording medium.

Further, in the above-mentioned embodiment, although two sorts of the current TV signals and the differential HDTV signals are switched in the hierarchical coding, the sorts of signals are not limited to only these signals. In addition, the coding apparatus can be applied to the case where the sorts of the signals increase more than two.

For instance, where the independent video signals and the other video signals are switched in the interframe prediction coding, it is possible to obtain high speed search video signals by reading only the independent video signals from the recording medium. Further, where the video codes and audio codes are switched, it is possible to reproduce only the audio codes from the recording medium.

Further, although the present embodiment has been explained by taking the case of the CLV (constant linear velocity) disk, it is of course possible to apply the coding apparatus according to the present invention to a MCLV (modified constant linear velocity) disk such that the disk revolution speed is controlled at a constant angular velocity (CAV) within a predetermined continuous number of tracks. In the case of the MCLV disk, however, the code quantity for each revolution does not necessarily change. In these cases, when the code contents do not match the disk angular position, it is difficult to obtain only the specific signals by skipping the tracks. In the embodiment of the present invention, however, the specific signals can be obtained by skipping tracks.

The state where the data stream coded by the coding apparatus according to the present invention are recorded on the recording medium will be described hereinbelow with reference to FIG. 5.

Figure 5:
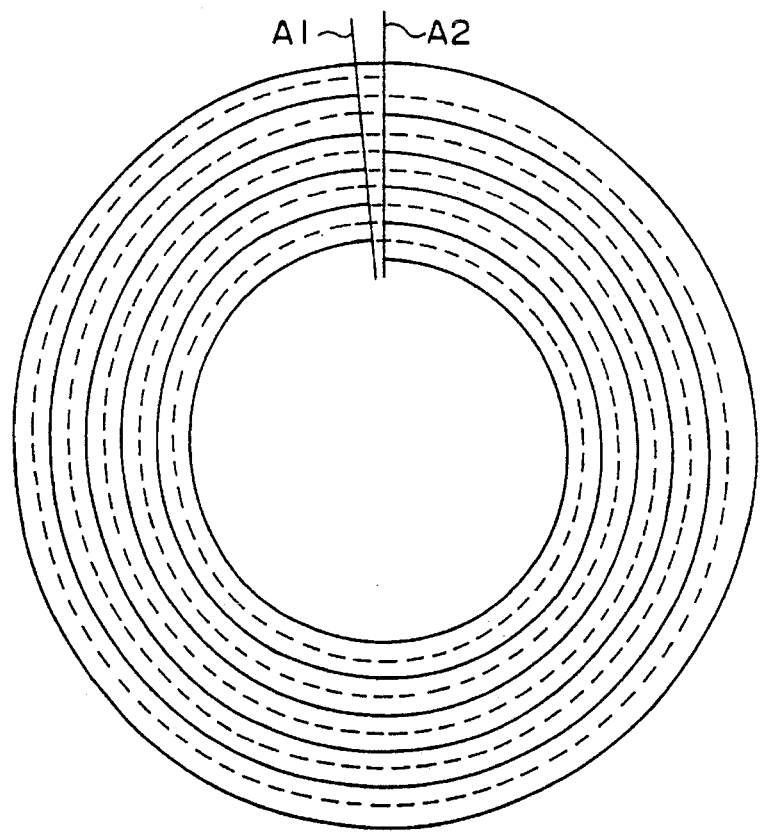
FIG. 5 is a view showing a disk recording form.

In FIG. 5, the signals are recorded in the same way as with the case of the ordinary CLV disk. However, the sorts of the signals are switched between the current TV signals (L) as shown by solid lines and the differential HDTV signals (H) as shown by dashed lines.

In FIG. 5, although a switch angle A1 from L to H is slightly offset from a switch angle A2 from H to L, this indicates that since the read track must be skipped to reproduce only L as already explained, the angle between which L are recorded is determined smaller than that between which H are recorded. In more detail, the angle between which L are recorded is from A2 to A1 (slightly less than 360 degrees) and the angle between which H are recorded is from A1 to A2 (a slightly more than 360 degrees). However, the switching from L to H and the switching from H to L can be made at the same angle both between A1 and A2 in FIG. 5.

A first embodiment of the reproducing apparatus for a disklike recording medium according to the present invention will be described hereinbelow with reference to FIG. 6. In the drawing, the same reference numerals have been retained for similar elements which have the same functions as with the case Of the prior art reproducing apparatus shown in FIG. 2, without repeating the same description thereof.

Figure 2:
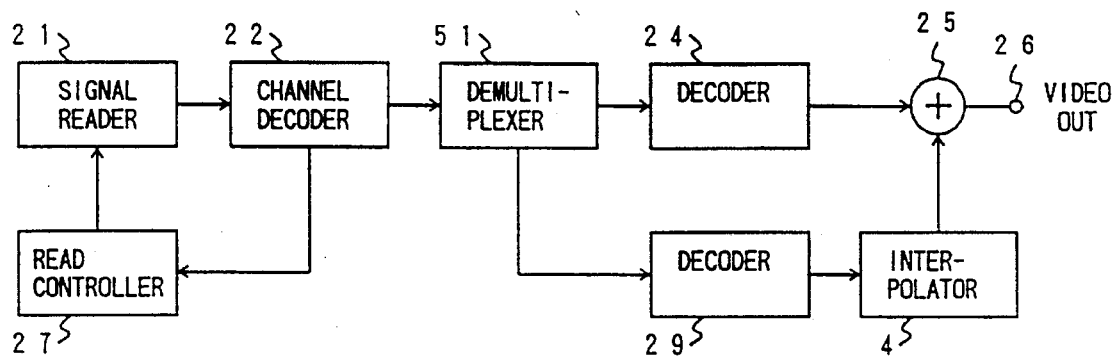
FIG. 2 is a block diagram showing an example of a prior art reproducing apparatus.
Figure 6:
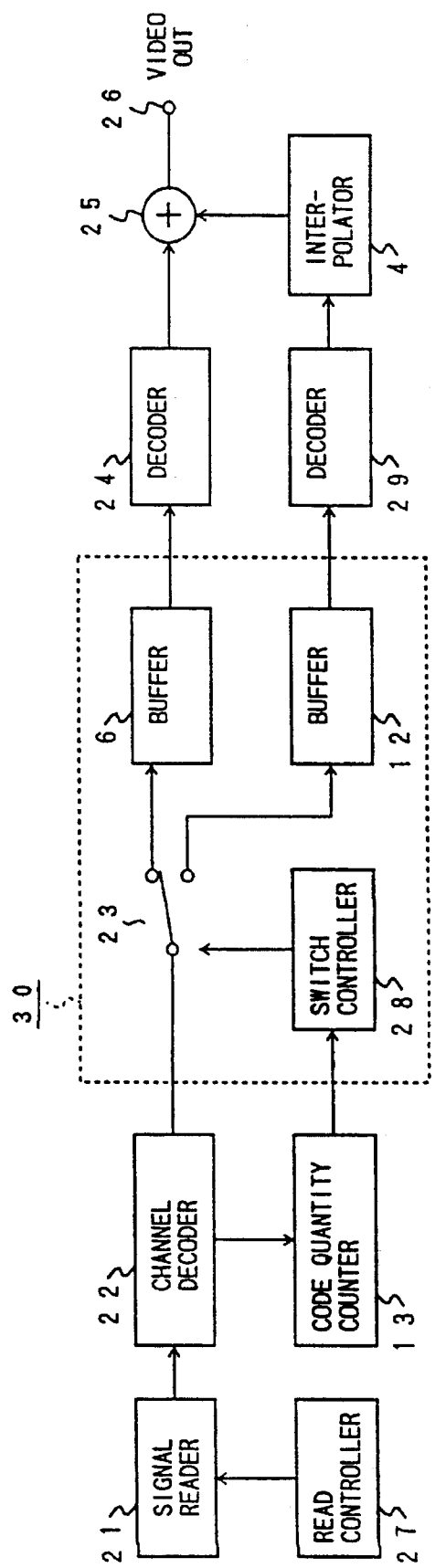
FIG. 6 is a block diagram showing a first embodiment of the reproducing apparatus for the disklike recording medium according to the present invention.

The difference in construction between FIGS. 2 and 6 is that multiplexed signal separating means 30 (composed of two buffers 6 and 12, a change-over switch 23 and a switch controller 28) and a code quantity counter 13 are provided instead of the multiplexer 51.

In FIG. 6, signals are read from a disk by a signal reader 21. Further, the codes are reproduced from the read signals by the channel recorder 22. After error correction processing, the reproduced codes are given to the change-over switch 23. Further, the actual timing at which the sorts of codes are switched and the track position signals are both given to the code quantity counter 13.

The code quantity for each revolution determined on the basis of the position signals of the read track is counted by the code quantity counter 13 to obtain a switch timing signal. The obtained switch timing signal is given to the switch controller 28. This switch timing signal is generated in synchronism with the actual switch timing at which the sorts of codes are switched.

Further, where the switch timings of the two sorts of signals do not perfectly match each other; that is, the switch timings are slightly offset from each other as shown in FIG. 4B, the switch timings are also corrected.

The change-over switch 23 is switched by the switch controller 28 according to the predetermined code transfer rates of the current TV signals and the differential HDTV signals, so that the output of the channel decoder 22 can be selectively given to the buffer 6 or the buffer 12.

That is, the codes of the current TV signals and the differential HDTV signals are separated by the change-over switch 23 on the basis of a selection signal given by the switch controller 28, so that the codes of the current TV signals are given to the buffer 12 and the codes of the differential HDTV signals are given to the buffer 6, respectively. The buffers 6 and 12 apply the obtained codes to the decoders 24 and 29, even when the codes are not being inputted thereto due to the switching operation of the signal sorts. The codes of the buffer 6 are given to the decoder 24 and the codes of the buffer 12 are given to the decoder 29, respectively. The output of the decoder 29 is applied to an interpolator 4 to interpolate the reproduced current TV signals, so that the number of the pixels of the interpolated signals is returned to the original number of pixels. The interpolated reproduced signals are given to an adder 25, in order to add the interpolated current TV signals and the differential HDTV signals, so that the reproduced HDTV video signals can be outputted through a video output terminal 26.

A second embodiment of the reproducing apparatus for a disklike recording medium according to the present invention will be described hereinbelow with reference to FIG. 7. In the drawing, the same reference numerals have been retained for similar elements which have the same functions as with the case of the first embodiment of the reproducing apparatus shown in FIG. 6, without repeating the same description thereof.

Figure 7:
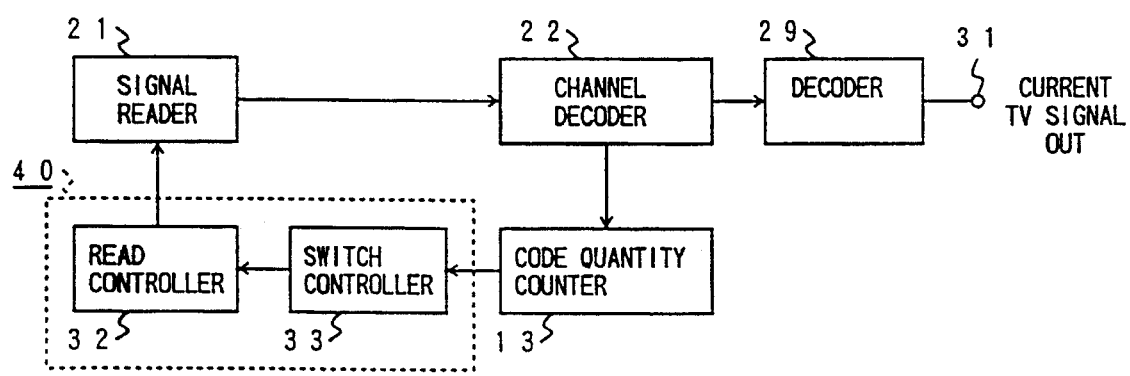
FIG. 7 is a block diagram showing a second embodiment of the reproducing apparatus for the disklike recording medium according to the present invention.

In the reproducing apparatus shown in FIG. 7, the codes coded by the coding apparatus as shown in FIG. 3 and then recorded in the disk are reproduced, and further only the codes of the current TV signals are decoded. In this reproducing apparatus, read control means 40 (composed of a read controller 32 and a switch controller 33) is provided, while omitting the buffers 6 and 12, the decoder 24, the interpolator 4, and the adder 25. In the reproducing apparatus shown in FIG. 7, the tracks from which the signals are read by the signal reader 21 are controlled by the read controller 32.

In the above-mentioned track control, only the current TV signals are read from the tracks under control of the switch controller 33. In the case where the current TV signals and the differential HDTV signals are both recorded on a disk alternately, the present read track is skipped to the second track beyond the succeeding track at the timing given by the switch controller 33.

The codes are reproduced on the basis of the read signals by the channel decoder 22 and then given to a decoder 29, after error correction processing. At the same time, timing signals (indicative of an actual timing at which the code contents are switched) and track position signals are given to a code quantity counter 13.

The code quantity for each revolution determined on the basis of the position signals of the read tracks is counted by the code quantity counter 13 to obtain a switch timing signal. The obtained switch timing signal is given to the switch controller 33. This switch timing signal is generated in synchronism with the actual switch timing at which the sorts of codes are switched.

In the switch controller 33, the skipping (to the second track, to the third track, etc. from the present track) and non-skipping are determined for each timing signal according to the previously determined ratios of the code transfer rates of the current TV signals and the differential HDTV signals. These selection signals are given to the controller 32. Therefore, the switch controller 28 shown in FIG. 6 is used to switch the buffers for storing read codes; on the other hand, the switch controller 33 shown in FIG. 7 is used to skip the read tracks.

In the same way as with the case of the reproducing apparatus shown in FIG. 6, the coded signals are decoded by the decoder 29, and the reproduced current TV video signals are outputted through a current TV video signal output terminal 31.

As described above, it is possible to read only necessary signals from the disk on which data coded by the coding apparatus shown in FIG. 3 are recorded in spite of the relatively simple control. In this case, since the quantity of the read signals can be reduced down to ½, it is possible to reduce the read speed down to ½, so that the signal band of the reader 21 and the processing rate of the channel decoder 22 can be both halved and in addition the revolution speed of the disk can be halved, thus simplifying the rotation control of the disk.

In the signal coding apparatus according to the present invention, the hierarchical signals are multiplexed by switching the sorts of signals according to the recording capacity for each predetermined revolution angle at the predetermined track on the recording medium. Further in the disklike recording medium according to the present invention, the sorts of the signals are switched at predetermined revolution angles of the disk on even the CLV (constant linear velocity) disk. Further, in the reproducing apparatus for the disklike recording medium according to the present invention, only the necessary signals can be read effectively by changing the sorts of read signals at the predetermined revolution angles on the disk.

In the case of the reproducing apparatus for reproducing only the priority signals, since the reading speed can be reduced according to the quantity of signals required to be read, it is possible to reduce the signal band or the processing rate of the reproducing apparatus. Further, since the rotational speed of the recording medium can be reduced, the rotational control can be facilitated, so that the driving apparatus for the recording medium can be also simplified.

Furthermore, in the case of the video signals of efficient coding, since independent images can be reproduced at the high speed search mode, it is possible to obtain search images of high quality.

What is claimed is:

1. A coding apparatus for coding a plurality of sorts of signals, multiplexing the coded signals, and recording the coded and multiplexed signals on a disklike recording medium, comprising:

separating means for hierarchically separating signals to be recorded into priority signals to be reproduced preferentially and non-priority signals other than the priority signals;

first coding means for coding the priority signals;

second coding means for coding the non-priority signals;

code quantity counting means for generating a timing signal whenever a quantity of the coded priority signals or the coded non-priority signals reaches a predetermined code quantity determined for each track of the recording medium; and switching means for switching the coded priority signals and the coded non-priority signals on the basis of the timing signal and outputting the switched and coded signals.

2. The coding apparatus of claim 1, wherein said code quantity counting means generates the timing signal controllably in such a way that the code quantity of the priority signals changes from the code quantity of the non-priority signals switched before or after the priority signals.

3. A disklike recording medium, wherein a plurality of sorts of signals are recorded thereon so that recording density of the signals which are recorded is constant in a linear direction; and the sorts of the signals are changed at predetermined revolution angles of the disklike recording medium.

4. A reproducing apparatus, comprising:

code quantity counting means for generating a timing signal for each predetermined code quantity by counting a code quantity of signals recorded on a disklike recording medium, the disklike recording medium having recorded thereon priority signals to be reproduced preferentially and non-priority signals other than the priority signals in such a way that the priority signals are changed to the non-priority signals or vice versa at predetermined revolution angles of the disklike recording medium;

switching means for switching reproduced signals from the priority signals to the non-priority signals or vice versa and outputting the switched reproduced signals;

control means for controlling timing of switching said switching means on the basis of the timing signal; and reproducing means for reproducing signals recorded on the disklike recording medium by decoding the switched and outputted priority signals or non-priority signals.

5. A reproducing apparatus, comprising:

a signal reader for reading signals recorded on a disklike recording medium on which priority signals to be reproduced preferentially and non-priority signals other than the priority signals are recorded in such a way that the priority signals are changed to the non-priority signals or vice versa at predetermined revolution angles of the disklike recording medium;

code quantity counting means for generating a timing signal for each determined code quantity according to the priority signals and the non-priority signals by counting a code quantity of the read signals;

control means for controlling said signal reader on the basis of the timing signal to read only the priority signals; and reproducing means for reproducing only the priority signals recorded on the disklike recording medium by decoding the read priority signals.

\* \* \* \* \*